United States Patent
Xiang et al.

(10) Patent No.: US 10,397,037 B2
(45) Date of Patent: Aug. 27, 2019

(54) INFORMATION TRANSMISSION METHOD AND APPARATUS IN WIRELESS LOCAL AREA NETWORK

(71) Applicant: HUAWEI TECHNOLOGIES CO., LTD., Shenzhen, Guangdong (CN)

(72) Inventors: Zhengzheng Xiang, Shanghai (CN); Jun Zhu, Shanghai (CN); Jiayin Zhang, Ottawa (CA); Jiyong Pang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/922,274

(22) Filed: Mar. 15, 2018

(65) Prior Publication Data

US 2018/0205587 A1 Jul. 19, 2018

Related U.S. Application Data

(63) Continuation of application No. PCT/CN2017/070462, filed on Jan. 6, 2017.

(30) Foreign Application Priority Data

Jan. 7, 2016 (CN) .......................... 2016 1 0011271

(51) Int. Cl.
*H04L 5/00* (2006.01)
*H04L 27/26* (2006.01)
(Continued)

(52) U.S. Cl.
CPC ........ *H04L 27/2621* (2013.01); *H04L 5/0007* (2013.01); *H04L 5/0048* (2013.01);
(Continued)

(58) Field of Classification Search
CPC ................................................. H04L 27/2621
(Continued)

(56) References Cited

U.S. PATENT DOCUMENTS 7,616,617 B2 * 11/2009 Pandey ................. H04W 48/12
370/328
8,811,259 B2 * 8/2014 Oh ......................... H04W 74/06
370/315
(Continued)

FOREIGN PATENT DOCUMENTS

CN   102164107 A    8/2011
CN   102714643 A   10/2012
(Continued)

OTHER PUBLICATIONS

Russian Office Action issued in Russian Application No. 2018108182/08(012667) dated Nov. 9, 2018, 6 pages.
(Continued)

*Primary Examiner* — Shripal K Khajuria
(74) *Attorney, Agent, or Firm* — Fish & Richardson P.C.

(57) ABSTRACT

Information transmission methods and apparatuses in a wireless local area network are provided. One example method includes generating a legacy signaling field (L-SIG) and a repeated legacy signaling field (RL-SIG), where subcarriers with indexes −28, −27, 27, and 28 in the L-SIG and the RL-SIG in a 20 MHz bandwidth carry −1, −1, −1, and 1, respectively. The example method also includes sending the generated L-SIG and RL-SIG.

18 Claims, 10 Drawing Sheets

(51) Int. Cl.
  *H04W 28/06* (2009.01)
  *H04L 25/02* (2006.01)
  *H04W 84/12* (2009.01)
(52) U.S. Cl.
  CPC ...... *H04L 25/0202* (2013.01); *H04L 27/2602* (2013.01); *H04W 28/06* (2013.01); *H04L 25/0224* (2013.01); *H04L 27/2628* (2013.01); *H04W 84/12* (2013.01)
(58) Field of Classification Search
  USPC .......................................................... 370/329
  See application file for complete search history.

(56) References Cited

U.S. PATENT DOCUMENTS

| | | | | |
|---|---|---|---|---|
| 2008/0002632 A1* | 1/2008 | Pandey | ................ | H04W 48/12 370/338 |
| 2008/0062922 A1* | 3/2008 | Qi | ........................ | H04W 36/08 370/331 |
| 2009/0122694 A1* | 5/2009 | Stephens | ................ | H04L 27/20 370/210 |
| 2011/0051705 A1* | 3/2011 | Jones, IV | ............ | H04L 27/2613 370/338 |
| 2011/0194544 A1* | 8/2011 | Yang | .................... | H04L 27/2613 370/338 |
| 2015/0117433 A1* | 4/2015 | Zhang | ..................... | H04L 69/22 370/338 |

FOREIGN PATENT DOCUMENTS

| | | |
|---|---|---|
| CN | 102823212 A | 12/2012 |
| CN | 103002448 A | 3/2013 |
| RU | 2402887 C2 | 10/2010 |
| RU | 2459387 C1 | 8/2012 |
| WO | 2013095382 A1 | 6/2013 |
| WO | 2015073437 A1 | 5/2015 |
| WO | 2015077042 A1 | 5/2015 |
| WO | 2015148434 A1 | 10/2015 |

OTHER PUBLICATIONS

Russian Search Report issued in Russian Application No. 2018108182/08(012667) dated Nov. 7, 2018, 2 pages.
Chinese Search Report issued in Chinese Application No. 201810148666x dated Nov. 23, 2018, 2 pages.
Chinese Office Action issued in Chinese Application No. 201810148666.x dated Dec. 3, 2018, 5 page.
Yasuhiko Inoue,"IEEE P802.11 Wireless LANs—IEEE 802.11 TGax",IEEE 802.11-16/0096r0,IEEE 802.11 Task Group ax,Jan. 2016 Atlanta Meeting,Hyatt Regency Atlanta, Atlanta, GA,Jan. 18-22, 2016,total 30 pages.
Robert Stacey,"IEEE P802.11 Wireless LANs—Specification Framework for TGax", IEEE802.11-15/0132r13,11-15-0132-13-00ax-spec-framework,dated Dec. 7, 2015,total 38 pages.
Chinese Search Report issued in Chinese Application No. 201610011271.6 dated Dec. 28, 2017, 6 pages.
International Search Report issued in International Application No. PCT/CN2017/070462 dated Mar. 8, 2017, 18 pages.
John Son (Wilus): "Discussions on HE SIG-A Structure;11-15-1119-01-00ax-discussions-on-he-sig-a-structure", Sep. 16, 2015, pp. 1-8, XP068098370.
Extended European Search Report issued in European Application No. 17735858.7 dated Sep. 11, 2018, 11 pages.

* cited by examiner

| Rate 4 bits | Reserved bit 1 bit | Length 12 bits | Parity check 1 bit | Tail bit 6 bits |

INFORMATION TRANSMISSION METHOD AND APPARATUS IN WIRELESS LOCAL AREA NETWORK

CROSS-REFERENCE TO RELATED APPLICATIONS

This application is a continuation of International Application No. PCT/CN2017/070462, filed on Jan. 6, 2017, which claims priority to Chinese Patent Application No. 201610011271.6, filed on Jan. 7, 2016. The disclosures of all the aforementioned applications are hereby incorporated by reference in their entireties.

TECHNICAL FIELD

Embodiments of the present invention relate to communications technologies, and in particular, to an information transmission method and apparatus in a wireless local area network.

BACKGROUND

A wireless local area network (WLAN) is a data transmission system, and replaces, by using a radio frequency (RF) technology, a legacy local area network comprising a twisted-pair copper wire, so that a user can transmit information via the wireless local area network by using a simple access architecture. Development and application of a WLAN technology have greatly changed people's communication manner and working manner, and bring unprecedented convenience to people. Wide application of intelligent terminals is accompanied by people's growing requirements for data network traffic. Development of the WLAN depends on standard formulation, popularization, and application. The IEEE 802.11 family is primary standards, and mainly includes 802.11, 802.11b/g/a, 802.11n, and 802.11ac. In all standards except the 802.11 and the 802.11b, an orthogonal frequency division multiplexing (OFDM) technology is used as a core technology at a physical layer.

Channel estimation is a process of estimating, according to a receive signal and by a specific criterion, a parameter of a channel through which a transmit signal passes. Performance of a wireless communications system is affected by a wireless channel to a great extent, such as shadow fading and frequency selective fading. Consequently, a transmission path between a transmitter and a receiver is extremely complex. Unlike a wired channel that is fixed and predictable, the wireless channel is characterized by high randomness. A channel needs to be estimated in coherent detection of an OFDM system, and channel estimation precision directly affects performance of the entire system.

The WLAN technology has been rapidly developed over the past dozen of years, and a core transmission standard is the IEEE 802.11 family of standards that includes the 802.11a, the 802.11n, the 802.11ac, and the like. In addition, the 802.11 family of standards is backward-compatible, that is, a subsequently developed standard is compatible with an existing standard. Currently, 802.11ax in a standardization process also needs to have a backward compatibility feature. A peak-to-average ratio (PAPR) of the wireless local area network needs to be reduced as much as possible in a corresponding standard.

SUMMARY

To reduce a PAPR of a wireless local area network, embodiments of the present invention provide an information transmission method in a wireless local area network. The method includes: generating a legacy signaling field L-SIG and/or a repeated legacy signaling field RL-SIG where subcarriers with indexes −28, −27, 27, and 28 in the L-SIG or the RL-SIG in a 20 MHz bandwidth carry −1, −1, −1, and 1 respectively; and sending the generated L-SIG/RL-SIG Certainly, besides −1, −1, −1, and 1, other preferable values are further provided in embodiments.

When a transmission bandwidth is greater than the 20 MHz bandwidth, the generating an L-SIG/RL-SIG includes: in each 20 MHz bandwidth in the transmission bandwidth, duplicating the L-SIG and the RL-SIG, in which the subcarriers with indexes −28, −27, 27, and 28 carry −1, −1, −1, and 1, over each 20 MHz subchannel in the transmission bandwidth and applying phase rotation for each 20 MHz subchannel in the transmission bandwidth.

Alternatively, when a transmission bandwidth is greater than the 20 MHz bandwidth, subcarriers inserted to the L-SIG/RL-SI in 11ax may correspondingly carry the other preferable values provided in the embodiments.

Correspondingly, an information transmission apparatus in a wireless local area network is provided, comprising a processing unit configured to perform the foregoing method, and an interface.

By means of simulation and comparison, the L-SIG or the RL-SIG in the embodiments of the present invention enables a system to have an extremely low PAPR value.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figures 1, 2:
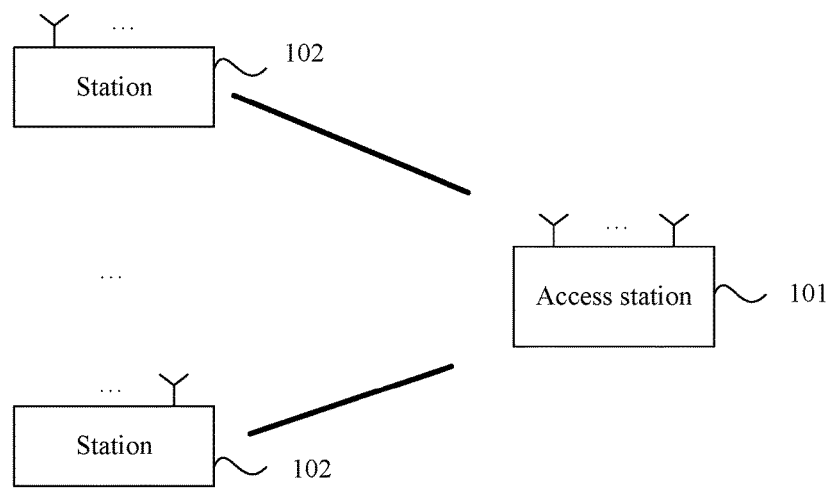
FIG. 1 is a simple schematic diagram of a wireless local area network in an embodiment of the present invention.
FIG. 2 is a simple schematic diagram of a packet structure in an embodiment (for example, 802.11ax) of the present invention.

Solutions of embodiments of the present invention may be applicable to a WLAN network system. FIG. 1 is a schematic diagram of a scenario to which a transmission method in a wireless local area network is applicable according to Embodiment 1 of the present invention. As shown in FIG. 1, the WLAN network system may include one access point 101 and at least two stations 102.

An access point (AP) may also be referred to as a wireless access point, a bridge, a hotspot, or the like, and may access a server or a communications network.

The station (STA) may also be referred to as user equipment, and may be a wireless sensor, a wireless communications terminal, or a mobile terminal, such as a mobile phone (or referred to as a "cellular" phone) that supports a WiFi communication function and a computer with a wireless communication function. For example, the station may be a portable, pocket-sized, handheld, computer built-in, wearable, or in-vehicle wireless communications apparatus that supports a WiFi communication function, which exchanges communication data such as a voice or data with a radio access network. A person skilled in the art learns that some communications devices may have functions of both the foregoing access point and the foregoing station, and no limitation is imposed herein.

FIG. 2 is a simple schematic diagram of a packet structure in 802.11ax. A high efficiency signaling field B (HE-SIGB) exists only in a downlink multi-user transmission packet.

Figures 3, 4:
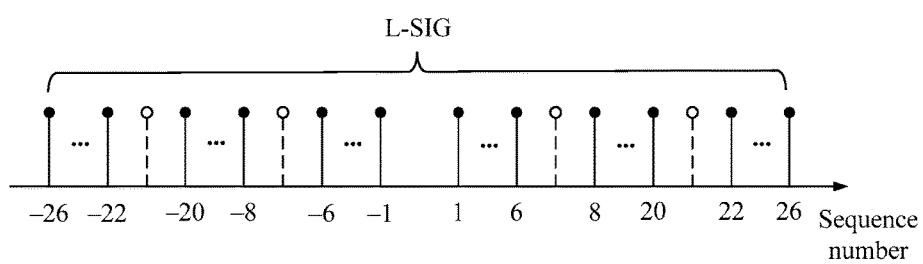
FIG. 3 is a simple schematic structural diagram of an L-SIG in an embodiment of the present invention.
FIG. 4 is a schematic diagram of subcarrier mapping of an L-SIG in a 20 MHz bandwidth in 802.11ac.

In the foregoing packet structure, a legacy short training field (L-STF), a legacy long training field (L-LTF), and a legacy signaling field (L-SIG) are a legacy preamble part, and one of functions of the legacy preamble part is to implement a backward compatibility feature. A repeated legacy signaling field (RL-SIG) is totally the same as the L-SIG, and one of functions of the RL-SIG is to automatically detect an 802.11ax packet. FIG. 3 is a schematic diagram of an L-SIG. It can be learned that the L-SIG field includes 24 information bits in total, and carries control information such as a rate and a length.

In existing 802.11ac, 48 encoded bits are obtained by performing binary convolutional coding (Binary Convolution Code) with a code rate of ½ on an L-SIG field; then, interleaving processing is performed; and modulation is performed by means of binary phase shift keying (Binary Phase Shift Key, BPSK) to obtain 48 symbols.

When a transmission bandwidth is 20 MHz, there are 64 subcarriers in a 1× mode, indexes of the subcarriers are $-32, \ldots, -1, 0, 1, \ldots,$ and 31, and a frequency spacing between neighboring subcarriers is $\Delta_F=312.5$ kHz. In these 64 subcarriers, there are 52 available subcarriers whose serial numbers are $-26, \ldots, -1, 1, \ldots,$ and 26. In the 52 subcarriers, there are 48 subcarriers used for L-SIG transmission, and indexes of these subcarriers are $-26, \ldots, -22, -20, \ldots, -8, -6, \ldots, -1, 1, \ldots, 6, 8, \ldots, 20, 22, \ldots,$ and 26; and remaining four subcarriers carry a pilot sequence. The foregoing obtained 48 symbols of the L-SIG are mapped to the subcarriers with indexes $-26, \ldots, -22, -20, \ldots, -8, -6, \ldots, -1, 1, \ldots, 6, 8, \ldots, 20,$ 22, ..., and 26. Then, the pilot sequence is inserted into subcarriers with indexes ±7 and ±21.

FIG. 4 is a schematic diagram of subcarrier mapping of an L-SIG in 20 MHz bandwidth. A direct-current subcarrier is not drawn, and empty subcarriers with indexes $-32, \ldots, -27, 27, \ldots,$ and 31 are not drawn either. A subcarrier that carries a pilot sequence is represented by a dotted line for distinction.

Figure 5A:
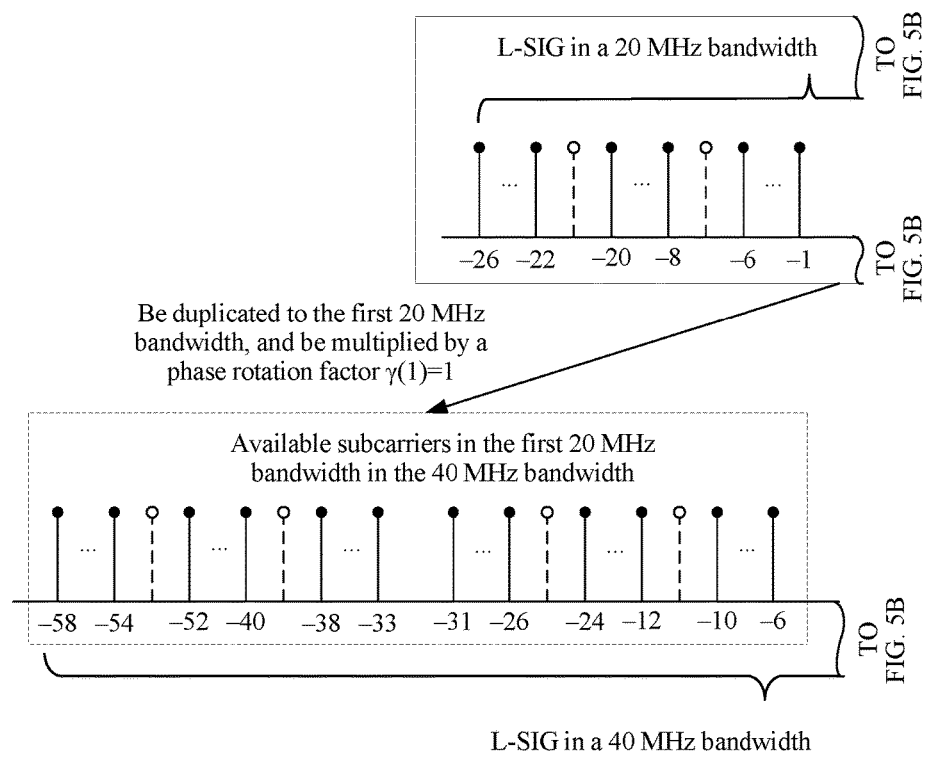
FIG. 5A and FIG. 5B are a schematic diagram of duplication and phase rotation of an L-SIG in a 40 MHz bandwidth in 802.11ac.
Figure 5B:
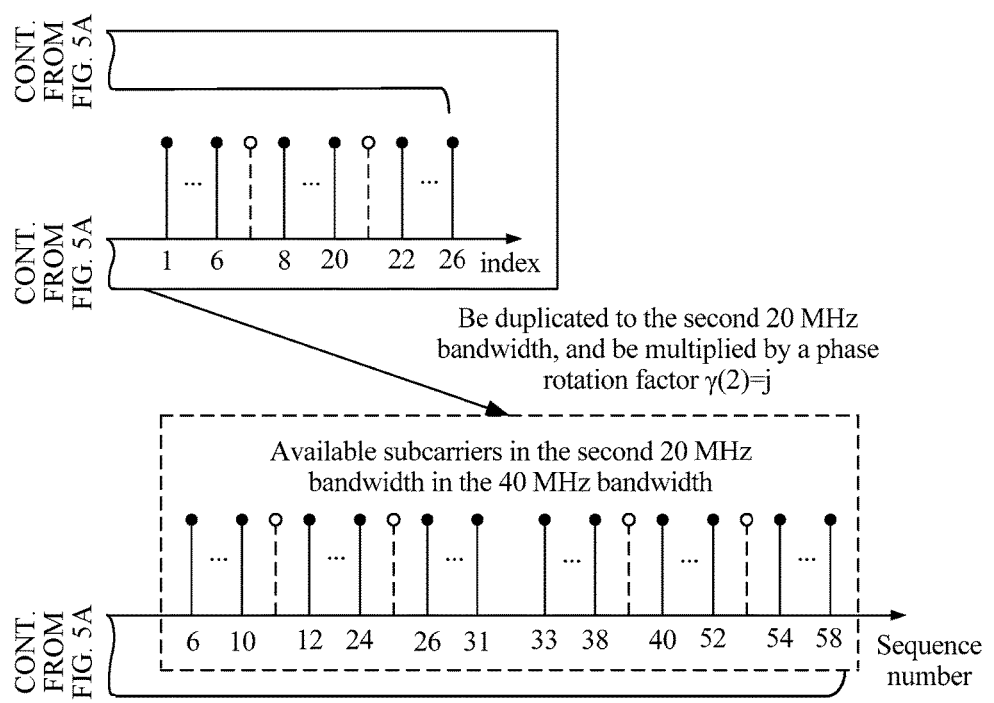

When a transmission bandwidth is greater than 20 MHz, the L-SIG (comprising the pilot sequence) needs to be duplicated and phase rotated over each 20 MHz subchannel. That is, content on subcarriers (comprising the pilot sequence) with indexes $-26, \ldots, -1, 1, \ldots,$ and 26 in the 20 MHz bandwidth is duplicated over each 20 MHz bandwidth, and appropriate phase rotation is applied for each 20 MHz bandwidth. Specifically, a 40 MHz bandwidth is used as an example. Indexes of 104 available subcarriers are $-58, \ldots, -33, -31, \ldots, -6, 6, \ldots, 31, 33, \ldots,$ and 58. The content of the subcarriers (comprising the pilot sequence) with indexes $-26, \ldots, -1, 1, \ldots,$ and 26 in the 20 MHz bandwidth is respectively duplicated to subcarriers with indexes $-58, \ldots, -33, -31, \ldots,$ and $-6$ (that is, available subcarriers of the L-SIG field in the first 20 MHz bandwidth in the 40 MHz bandwidth), and subcarriers with indexes $6, \ldots, 31, 33, \ldots,$ and 58 (that is, available subcarriers of the L-SIG field in the second 20 MHz bandwidth in the 40 MHz bandwidth) in the 40 MHz bandwidth. Then, phase rotation is applied for each 20 MHz bandwidth. Specifically, symbols on the subcarriers with indexes $-58, \ldots, -33, -31, \ldots,$ and $-6$ in the 40 MHz bandwidth are multiplied by a phase rotation factor $\gamma(1)=1$, and symbols on the subcarriers with indexes $6, \ldots, 31, 33, \ldots,$ and 58 in the 40 MHz bandwidth are multiplied by a phase rotation factor $\gamma(2)=j$, where $j=\sqrt{-1}$. FIG. 5A and FIG. 5B are a schematic diagram of duplication and phase rotation of an L-SIG in a 40 MHz bandwidth. Duplication and phase rotation are similarly performed in an 80 MHz bandwidth and a 160 MHz bandwidth. Details are not described.

Figure 6:
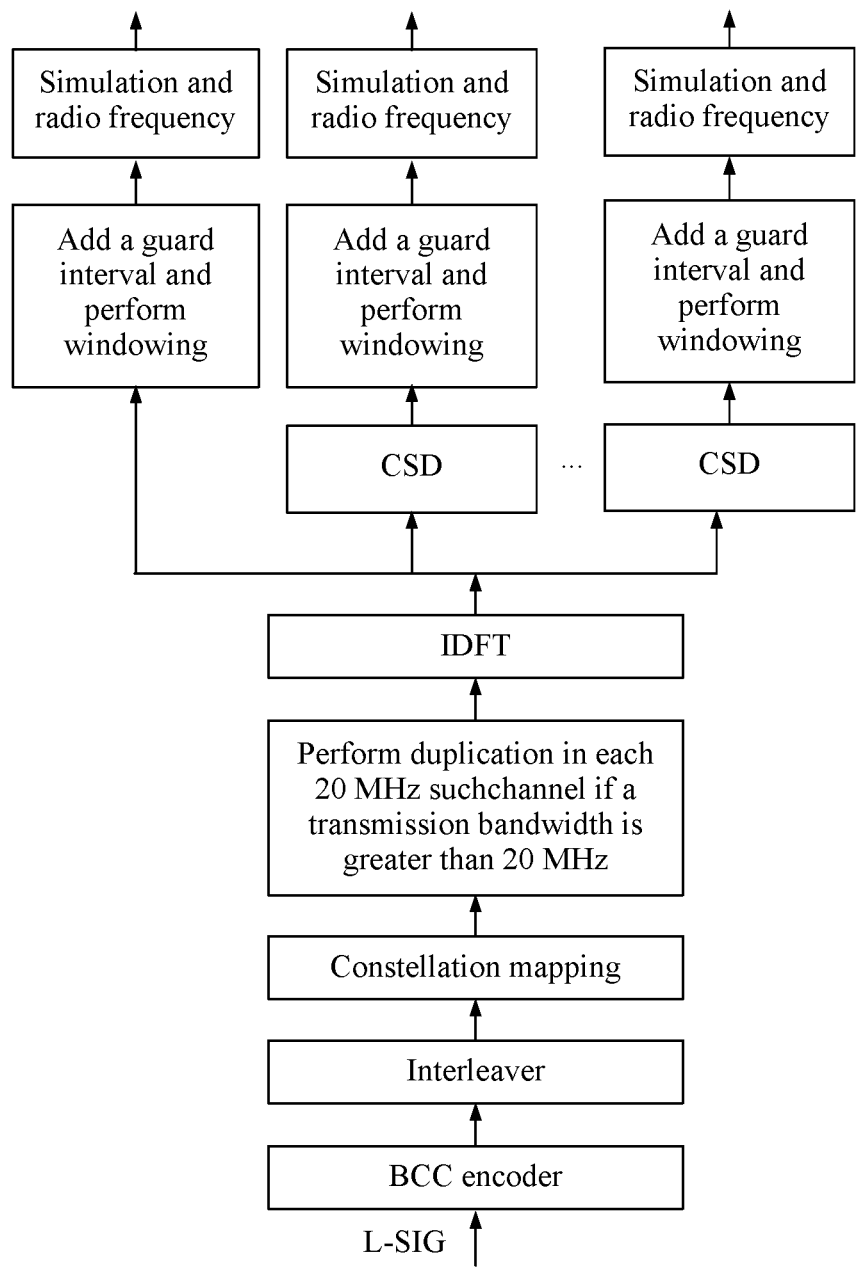
FIG. 6 is a procedure of sending an L-SIG in 802.11ac.

Then, inverse discrete Fourier transform (IDFT) is performed, and corresponding cyclic shift delay (CSD) is performed on each transmit chain and a frequency segment. Then, a guard interval (GI) is inserted and a window function is performed to obtain a baseband signal of the L-SIG. Finally, frequency shift is performed on the baseband signal, and then, the baseband signal is transmitted by using a radio frequency port. FIG. 6 shows a procedure of sending an L-SIG in 802.11ac standard.

Figure 7:
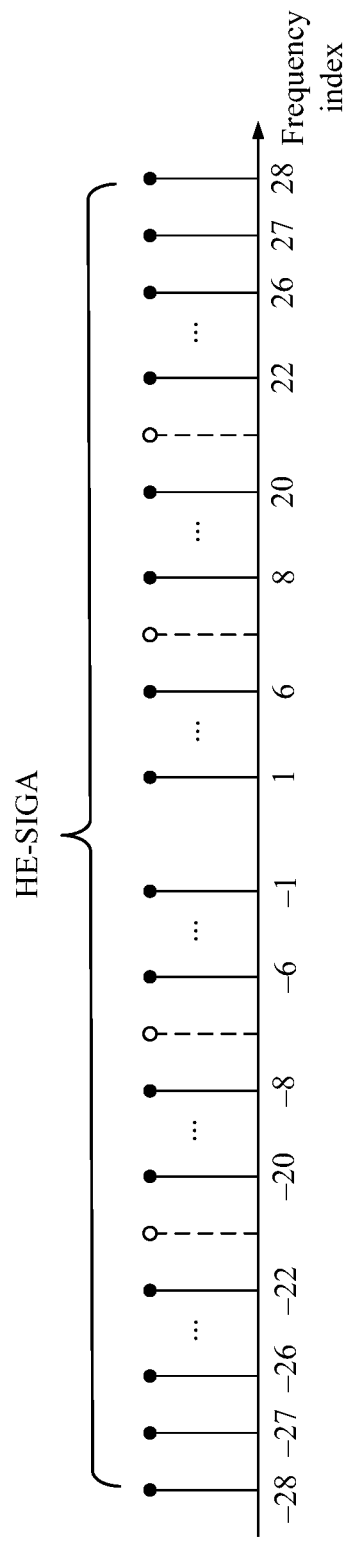
FIG. 7 is a schematic diagram of subcarrier mapping of an HE-SIG A in a 20 MHz bandwidth in an embodiment (for example, 802.11ax) of the present invention.

However, in the 802.11ac standard, for a legacy preamble part, there are 52 available subcarriers in each 20 MHz bandwidth. 48 subcarriers are used to carry data, and remaining four subcarriers are used to carry a pilot. However, in a latest 802.11ax standard, a number of available subcarriers in an HE-SIG A field in a preamble of a packet is 56, increasing from 52 (indexes of the available subcarriers are $-28, -27, -26, \ldots, -1, 1, \ldots, 26, 27,$ and 28). A number of subcarriers used to carry data is 52, increasing from 48 (indexes of the subcarriers are $-28, -27, -26, \ldots, -22, -20, \ldots, -8, -6, \ldots, -1, 1, \ldots, 6, 8, \ldots, 20, 22, \ldots, 26, 27,$ and 28), and remaining four subcarriers still carry a pilot sequence. FIG. 7 is a schematic diagram of subcarrier mapping of an HE-SIG A field in a 20 MHz bandwidth.

Figure 8:
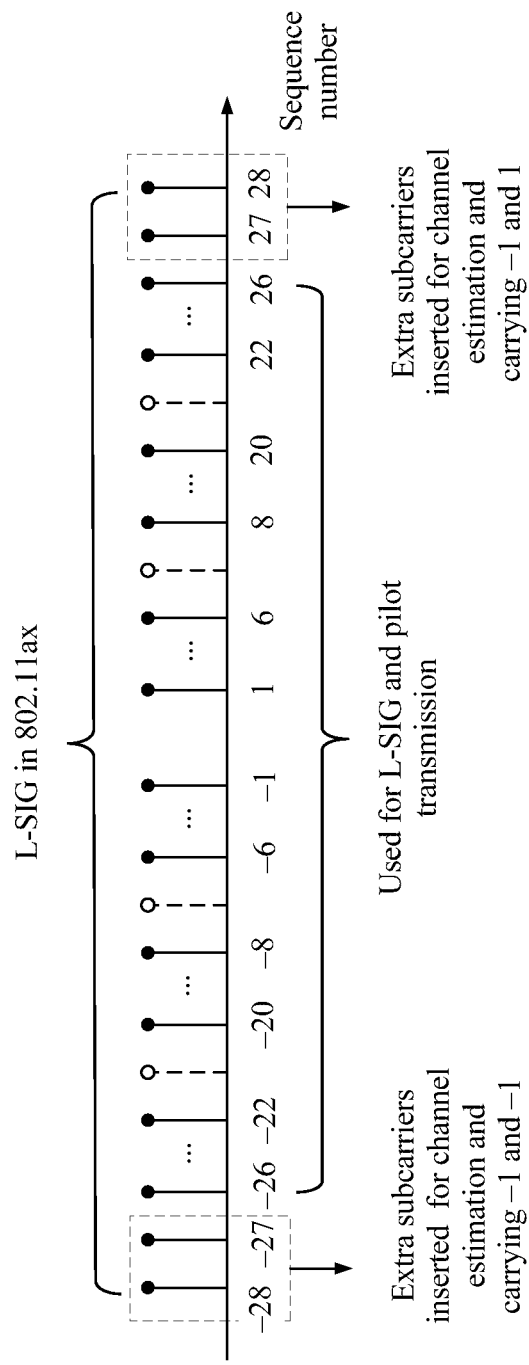
FIG. 8 is a simple schematic diagram of subcarrier mapping of an L-SIG in a 20 MHz bandwidth in an embodiment (for example, 802.11ax) of the present invention.

To enable an access point (AP) or a station (STA) to decode data in the HE-SIG A, channels of the foregoing 52 subcarriers with indexes $-28, -27, -26, \ldots, -22, -20, \ldots, -8, -6, \ldots, -1, 1, \ldots, 6, 8, \ldots, 20, 22, \ldots, 26, 27,$ and 28 need to be estimated. Channels of the 48 subcarriers with indexes −26, . . . , −22, −20, . . . , −8, −6, . . . −1, 1, . . . , 6, 8, . . . , 20, 22, . . . , and 26 may be estimated by using an L-STF field and an L-LTF field. However, there is no value on subcarriers with indexes −28, −27, 27, and 28 in the L-STF and the L-LTF, that is, the four subcarriers are not used. Therefore, channels of the subcarriers with indexes −28, −27, 27, and 28 cannot be estimated by using the L-STF field and the L-LTF field. To estimate the channels of the subcarriers with indexes −28, −27, 27, and 28, extra four subcarriers with indexes −28, −27, 27, and 28 are inserted to the L-SIG/RL-SIG field in an 802.11ax draft. In this case, subcarriers occupied by an L-SIG/RL-SIG in a 20 MHz bandwidth are shown in FIG. 8.

In an L-SIG transmission manner in existing 802.11ac, subcarriers with indexes −28, −27, 27, and 28 are not used. Therefore, there is no solution to problems such as how to transmit the four subcarriers in the 802.11ax, what content needs to be carried by the four subcarriers, and how to perform processing accordingly when a transmission bandwidth is greater than 20 MHz.

Embodiment 1

In 802.11ax, an RL-SIG is totally the same as an L-SIG. Therefore, the L-SIG is used as an object for description below, and similar processing is performed for the RL-SIG.

In a preferable embodiment, the L-SIG/RL-SIG field is generated or processed. Content carried by subcarriers with indexes −28, −27, 27, and 28 in the L-SIG/RL-SIG field in a 20 MHz bandwidth is −1, −1, −1, and 1 respectively, and is denoted as C1. Then, subsequent processing is performed. For example, the generated or processed L-SIG/RL-SIG is sent. By using the content, a maximum PAPR of the L-SIG/RL-SIG in which extra subcarriers are inserted can be extremely small in 2730 different values.

Alternatively, in another preferable embodiment, the L-SIG/RL-SIG field is generated or processed. Content carried by subcarriers with indexes −28, −27, 27, and 28 in the L-SIG/RL-SIG field in a 20 MHz bandwidth is respectively 1, −1, −1, and 1, and is denoted as C2. Then, subsequent processing is performed. For example, the generated or processed L-SIG/RL-SIG is sent. By using content, an average PAPR of the L-SIG/RL-SIG to which extra subcarriers are inserted is also extremely small in 2730 different values.

Figure 9:
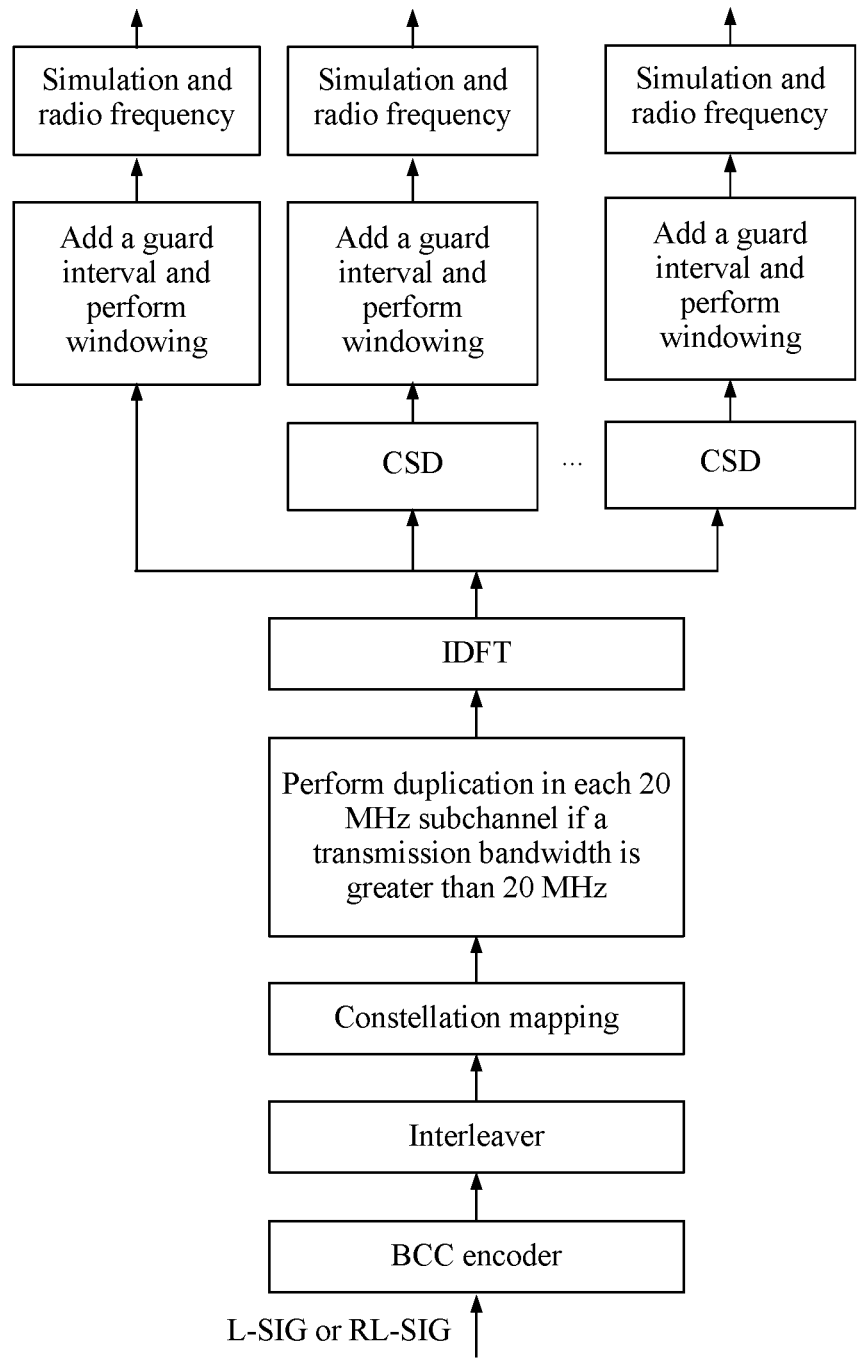
FIG. 9 is a procedure of sending an L-SIG/RL-SIG after extra subcarriers are inserted to the L-SIG/RL-SIG in an embodiment (for example, 802.11ax) of the present invention.

In this embodiment, when a transmission bandwidth is greater than 20 MHz (for example, 40 MHz, 80 MHz, or 160 MHz), reference may be made to a processing manner in 802.11ac. The foregoing L-SIG (comprising the subcarriers with indexes −28, −27, 27, and 28) is duplicated over each 20 MHz subchannel and phase rotation are applied for each 20 MHz subchannel. FIG. 9 shows a procedure 1 (which may be applicable to all transmission bandwidths, where the step of "performing duplication over each 20 MHz subchannel" is not required in a 20 MHz bandwidth channel) of sending an L-SIG/RL-SIG. In this embodiment, a difference from the 802.11ac standard comprises: in addition to executing existing steps in the 802.11ac standard, a constellation mapping module is configured to further insert the foregoing content C1 or C2 on the subcarriers with indexes −28, −27, 27, and 28.

In this embodiment, specifically, a maximum PAPR, obtained by means of simulation, of the content C1 (−1, −1, −1, 1) is 10.45 dB in the 20 MHz transmission bandwidth, and maximum PAPRs of some other content reach up to 12.06 dB in the 20 MHz bandwidth. A maximum PAPR of the content C1 (−1, −1, −1, 1) is 13.14 dB in a 40 MHz transmission bandwidth, and maximum PAPRs of some other content reach up to 14.59 dB in the 40 MHz bandwidth. A maximum PAPR of the content C1 (−1, −1, −1, 1) is 12.45 dB in an 80 MHz transmission bandwidth, and maximum PAPRs of some other content reach up to 14.28 dB in the 80 MHz bandwidth. A maximum PAPR of the content C1 (−1, −1, −1, 1) is 13.84 dB in a 160 MHz transmission bandwidth, and maximum PAPRs of some other content reach up to 15.32 dB in the 160 MHz bandwidth.

Specifically, an average PAPR, obtained by means of simulation, of the content C2 (1, −1, −1, 1) is 6.74 dB in the 20 MHz transmission bandwidth, and average PAPRs of some other content reach up to 7.29 dB in the 20 MHz transmission bandwidth. An average PAPR of the content C2 (1, −1, −1, 1) is 9.56 dB in the 40 MHz transmission bandwidth, and average PAPRs of some other content reach up to 9.97 dB in the 40 MHz bandwidth. An average PAPR of the content C2 (1, −1, −1, 1) is 8.86 dB in the 80 MHz transmission bandwidth, and average PAPRs of some other content reach up to 9.48 dB in the 80 MHz bandwidth. A maximum PAPR of the content C2 (1, −1, −1, 1) is 10.27 dB in the 160 MHz transmission bandwidth, and maximum PAPRs of some other content reach up to 11.35 dB in the 160 MHz bandwidth.

Embodiment 2

Embodiment 2 is different from Embodiment 1. When a transmission bandwidth is greater than 20 MHz, after duplication and phase rotation are performed on an L-SIG/RL-SIG over each 20 MHz bandwidth, a corresponding value is inserted into a corresponding subcarrier. In this embodiment, in this case, extra subcarriers in the L-SIG/RL-SIG field may carry different content in different bandwidths of 20 MHz. In this way, a maximum PAPR or an average PAPR of the L-SIG/RL-SIG in 2730 different values can be further reduced.

Figure 10:
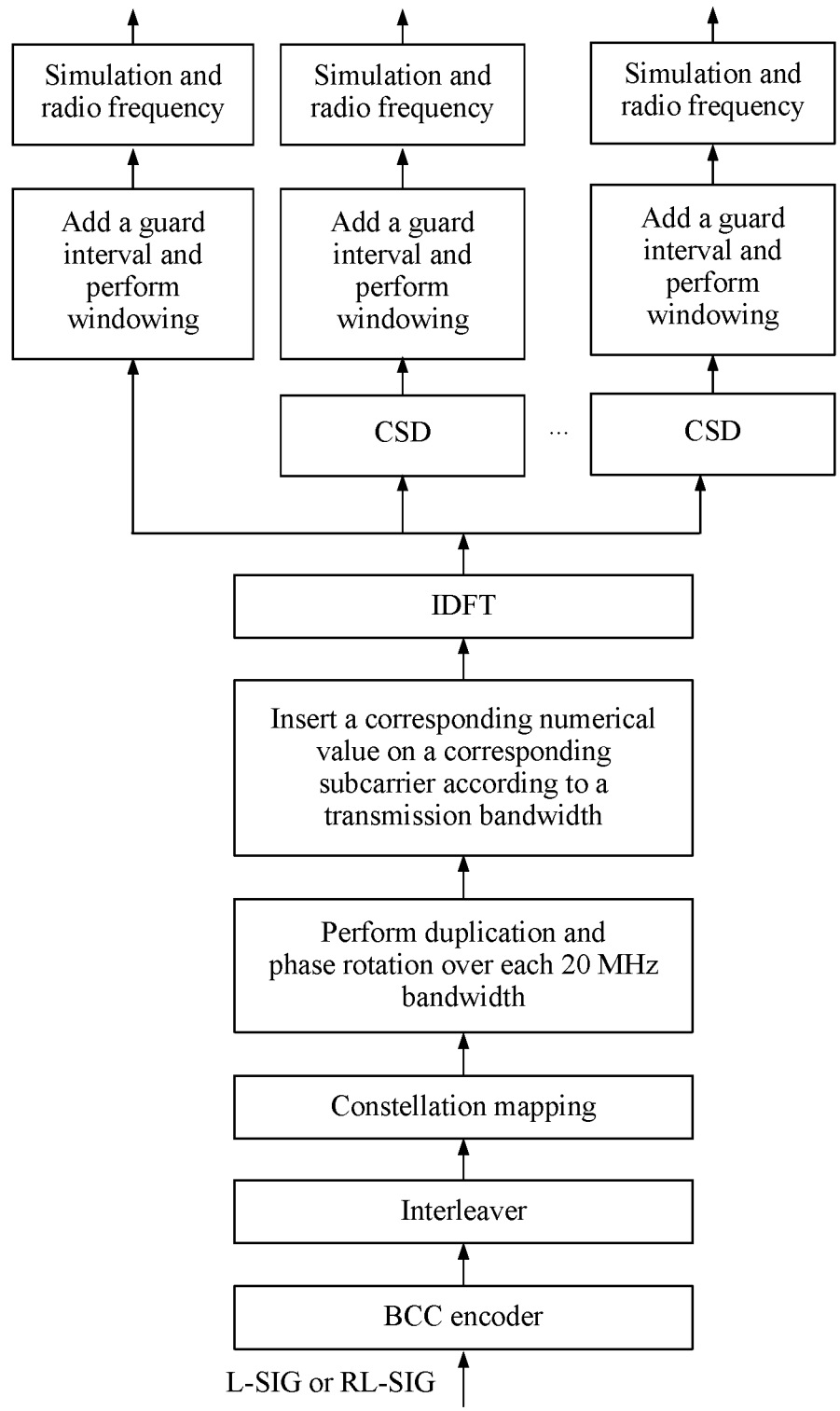
FIG. 10 is another procedure of sending an L-SIG/RL-SIG after extra subcarriers are inserted to the L-SIG/RL-SIG in an embodiment (for example, 802.11ax) of the present invention.

FIG. 10 shows a procedure of sending an L-SIG/RL-SIG when a transmission bandwidth is greater than 20 MHz in this embodiment.

In FIG. 10, a module of "inserting a corresponding value at a corresponding subcarrier location according to the transmission bandwidth" is specifically described:

(1) When the transmission bandwidth is 40 MHz, content 1, −1, −1, 1, −j, −j, −j, and j or content −1, −1, 1, 1, j, −j, −j, and −j is respectively inserted into subcarriers with indexes −60, −59, −5, −4, 4, 5, 59, and 60, where $j=\sqrt{-1}$. The content 1, −1, −1, 1, −j, −j, −j, and j is determined according to a rule of minimizing a maximum PAPR, a maximum PAPR of the content is 12.83 dB, and maximum PAPRs of some other content reach up to 14.59 dB. The content −1, −1, 1, 1, j, −j, −j, and −j is determined according to a rule of minimizing an average PAPR, an average PAPR of the content is 9.39 dB, and average PAPRs of some other content reach up to 9.97 dB.

(2) When the transmission bandwidth is 80 MHz, content 1, −1, −1, −1, −1, 1, 1, 1, 1, 1, 1, −1, −1, 1, 1, and 1 or content 1, −1, −1, 1, −1, 1, 1, −1, 1, 1, 1, 1, −1, 1, −1, and −1 is respectively inserted into subcarriers with indexes −124, −123, −69, −68, −60, −59, −5, −4, 4, 5, 59, 60, 68, 69, 123, and 124. The content 1, −1, −1, −1, −1, 1, 1, 1, 1, 1, 1, −1, −1, 1, 1, and 1 is determined according to a rule of minimizing a maximum PAPR, a maximum PAPR of the content is 12.34 dB, and maximum PAPRs of some other content reach up to 14.28 dB. The content 1, −1, −1, 1, −1, 1, 1, −1, 1, 1, 1, 1, −1, 1, −1, and −1 is determined according to a rule of minimizing an average PAPR, an average PAPR of the content is 8.73 dB, and average PAPRs of some other content reach up to 9.48 dB.

(3) When the transmission bandwidth is 160 MHz, content −1, −1, −1, 1, 1, 1, 1, −1, 1, 1, 1, −1, −1, −1, −1, 1, −1, −1, −1, 1, 1, 1, 1, −1, 1, 1, 1, −1, 1, 1, 1, and −1 or content 1, −1, −1, 1, −1, 1, 1, −1, 1, −1, −1, 1, 1, −1, −1, 1, −1, 1, 1, −1, 1, −1, −1, 1, −1, 1, 1, −1, −1, 1, 1, and −1 is respectively inserted into subcarriers with indexes −252, −251, −197, −196, −188, −187, −133, −132, −124, −123, −69, −68, −60, −59, −5, −4, 4, 5, 59, 60, 68, 69, 123, 124, 132, 133, 187, 188, 196, 197, 251, and 252. The content −1, −1, −1, 1, 1, 1, 1, −1, 1, 1, 1, −1, −1, −1, −1, 1, −1, −1, −1, 1, 1, 1, 1, −1, 1, 1, 1, −1, 1, 1, 1, and −1 is determined according to a rule of minimizing a maximum PAPR, a maximum PAPR of the content is 13.79 dB, and maximum PAPRs of some other content reach up to 15.32 dB. The content 1, −1, −1, 1, −1, 1, 1, −1, 1, −1, −1, 1, 1, −1, −1, 1, −1, 1, 1, −1, 1, −1, −1, 1, −1, 1, 1, −1, −1, 1, 1, and −1 is determined according to a rule of minimizing an average PAPR, an average PAPR of the content is 10.10 dB, and average PAPRs of some other content reach up to 11.38 dB.

According to the L-SIG/RL-SIG transmission method and apparatus provided in the present invention, the L-SIG/RL-SIG is characterized by a good PAPR, and is easily implemented in different bandwidth conditions.

The present invention may be applied to a wireless local area network that includes but is not limited to a Wi-Fi system represented by 802.11a, 802.11b, 802.11g, 802.11n, or 802.11ac; or may be applied to a next-generation Wi-Fi system or a next-generation wireless local area network system.

Figure 11:
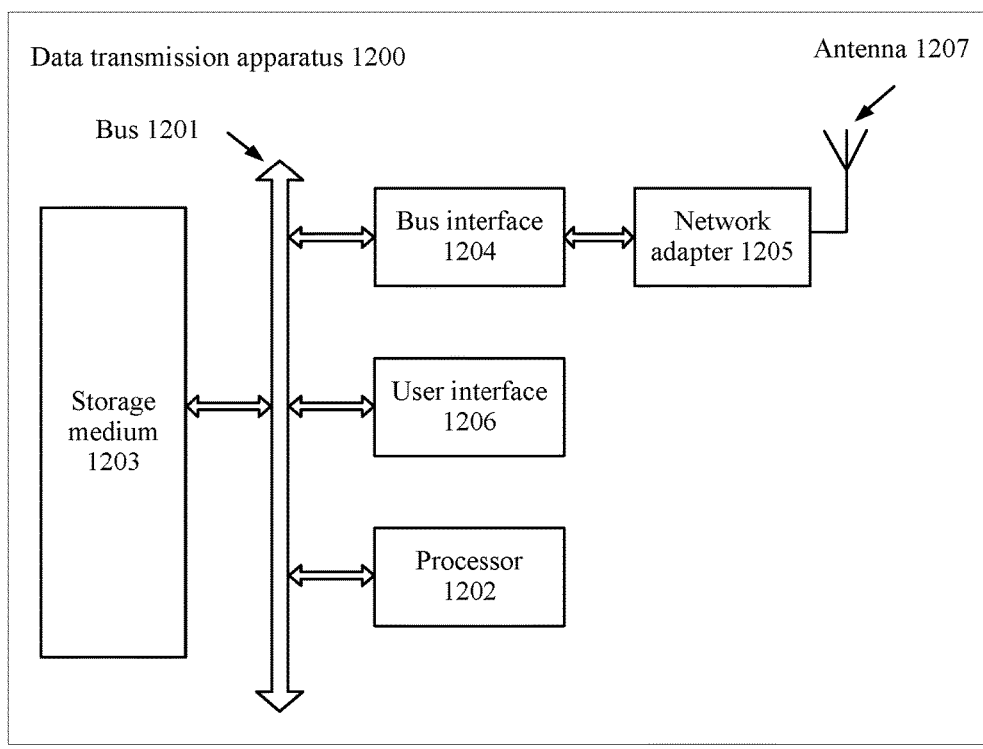
FIG. 11 is a simple schematic diagram of an information transmission apparatus in an embodiment of the present invention.

The present invention further provides an information transmission apparatus that may perform the foregoing method. FIG. 11 is an example (for example, some components in the figure such as an access point, a station, and a chip are optional) of a schematic structural diagram of an information transmission apparatus in an embodiment of the present invention. As shown in FIG. 9, an information transmission apparatus 1200 may be implemented by using a bus 1201 as a general bus architecture. The bus 1201 may include any quantity of interconnected buses and bridges according to specific application and an overall design constraint condition that are of the information transmission apparatus 1200. Various circuits are connected together by using the bus 1201. These circuits include a processor 1202, a storage medium 1203, and a bus interface 1204. In the information transmission apparatus 1200, a network adapter 1205 and the like are connected via the bus 1201 by using the bus interface 1204. The network adapter 1205 may be configured to: implement a signal processing function at a physical layer in a wireless local area network, and send and receive a radio frequency signal by using an antenna 1207. A user interface 1206 may be connected to a user terminal such as a keyboard, a display, a mouse, or a joystick. The bus 1201 may be further connected to various other circuits, such as a timing source, a peripheral device, a voltage regulator, and a power management circuit. These circuits are known in the art. Therefore, details are not described.

Alternatively, the information transmission apparatus 1200 may be configured as a general-purpose processing system. The general-purpose processing system includes: one or more microprocessors that provide a processor function, and an external memory that provides at least one part of the storage medium 1203. All the components are connected to another support circuit by using an external bus architecture.

Alternatively, the information transmission apparatus 1200 may be implemented by using an ASIC (application-specific integrated circuit) that includes the processor 1202, the bus interface 1204, and the user interface 1206, and at least one part that is of the storage media 1203 and that is integrated into a single chip. Alternatively, the information transmission apparatus 1200 may be implemented by using one or more FPGAs (field programmable gate array), a PLD (programmable logic device), a controller, a state machine, gate logic, a discrete hardware component, any other appropriate circuit, or any combination of circuits that can perform various functions described in the present invention.

The processor 1202 is responsible for bus management and general processing (comprising executing software stored on the storage medium 1203). The processor 1202 may be implemented by using one or more general-purpose processors and/or dedicated processors. The processor includes, for example, a microprocessor, a microcontroller, a digital signal processing (DSP) processor, or another circuit that can execute software. Regardless of whether the software is referred to as software, firmware, middleware, micro code, hardware description language, or the like, the software should be broadly construed as an instruction, data, or any combination thereof.

It is shown in FIG. 11 that the storage medium 1203 is separated from the processor 1202. However, a person skilled in the art easily understands that the storage medium 1203 or any part of the storage medium 1203 may be located outside the information transmission apparatus 1200. For example, the storage medium 1203 may include a transmission line, a carrier waveform obtained by means of data modulation, and/or a computer product separated from a wireless node. All the media may be accessed by the processor 1202 by using the bus interface 1204. Alternatively, the storage medium 1203 or any part of the storage medium 1203 may be integrated into the processor 1202, for example, may be a cache and/or a general-purpose register.

The processor 1202 may perform the foregoing embodiment, and details are not described herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

What is claimed is:

1. An information transmission method in a wireless local area network, comprising:

generating a legacy signaling field (L-SIG) and a repeated legacy signaling field (RL-SIG), wherein subcarriers with indexes −28, −27, 27, and 28, in the L-SIG in a 20 MHz bandwidth, carry −1, −1, −1, and 1, respectively, and subcarriers with indexes −28, −27, 27, and 28, in the RL-SIG in the 20 MHz bandwidth, carry −1, −1, −1, and 1, respectively; and sending the generated L-SIG and RL-SIG.

2. The method according to claim 1, wherein when a transmission bandwidth is greater than the 20 MHz bandwidth, generating the L-SIG and the RL-SIG further comprises:

duplicating the L-SIG and the RL-SIG for each 20 MHz subchannel in the transmission bandwidth; and applying a phase rotation for each 20 MHz subchannel.

3. The method according to claim 1, further comprising:
generating a legacy short training field (L-STF) and a legacy long training field (L-LTF) in accordance with an IEEE 802.11ac standard, wherein the L-STF and the L-LTF are carried on 48 subcarriers with indexes −26, . . . , −22, −20, . . . , −8, −6, . . . , −1, 1, . . . , 6, 8, . . . , 20, 22, . . . , and 26 in the 20 MHz bandwidth.

4. An information transmission method in a wireless local area network, comprising:
receiving a legacy signaling field (L-SIG) and a repeated legacy signaling field (RL-SIG); and
performing channel estimations, wherein a sequence −1, −1, −1, and 1 is used for channel estimations of subcarriers with indexes −28, −27, 27, and 28 in the L-SIG in a 20 MHz bandwidth, and the sequence −1, −1, −1, and 1 is used for channel estimations of subcarriers with indexes −28, −27, 27, and 28 in the RL-SIG in the 20 MHz bandwidth.

5. The method according to claim 4, wherein performing the channel estimations further comprises:
when a transmission bandwidth is greater than the 20 MHz bandwidth, using the sequence −1, −1, −1, and 1 for channel estimations of subcarriers with indexes −28, −27, 27, and 28 in each 20 MHz bandwidth in the transmission bandwidth.

6. The method according to claim 4, further comprising:
receiving a legacy short training field (L-STF) and a legacy long training field (L-LTF) in accordance with an IEEE 802.11ac standard, wherein the L-STF and the L-LTF are used for channel estimations of 48 subcarriers with indexes −26, . . . , −22, −20, . . . , −8, −6, . . . , −1, 1, . . . , 6, 8, . . . , 20, 22, . . . , and 26 in the L-SIG in the 20 MHz bandwidth, and the L-STF and the L-LTF are also used for channel estimation of 48 subcarriers with indexes −26, . . . , −22, −20, . . . , −8, −6, . . . , −1, 1, . . . , 6, 8, . . . , 20, 22, . . . , and 26 in the RL-SIG in the 20 MHz bandwidth.

7. An information transmission apparatus in a wireless local area network, comprising:
at least one processor; and
a non-transitory computer-readable storage medium coupled to the at least one processor and storing programming instructions for execution by the at least one processor, the programming instructions instruct the at least one processor to:
generate a legacy signaling field (L-SIG) and a repeated legacy signaling field (RL-SIG), wherein subcarriers with indexes −28, −27, 27, and 28, in the L-SIG in a 20 MHz bandwidth, carry −1, −1, −1, and 1, respectively, and subcarriers with indexes −28, −27, 27, and 28, in the RL-SIG in the 20 MHz bandwidth, carry −1, −1, −1, and 1, respectively.

8. The apparatus according to claim 7, wherein the programming instructions further instruct the at least one processor to:
when a transmission bandwidth is greater than the 20 MHz bandwidth, duplicate the L-SIG and the RL-SIG for each 20 MHz subchannel in the transmission bandwidth; and
apply a phase rotation for each 20 MHz subchannel.

9. The apparatus according to claim 7, wherein the programming instructions further instruct the at least one processor to:

generate a legacy short training field (L-STF) and a legacy long training field (L-LTF) in accordance with an IEEE 802.11ac standard, wherein the L-STF and the L-LTF are carried on 48 subcarriers with indexes −26, . . . , −22, −20, . . . , −8, −6, . . . , −1, 1, . . . , 6, 8, . . . , 20, 22, . . . , and 26 in the 20 MHz bandwidth.

10. An information transmission method in a wireless local area network, comprising:
generating a legacy signaling field (L-SIG) and a repeated legacy signaling field (RL-SIG), wherein subcarriers with indexes −28, −27, 27, and 28, in the L-SIG in a 20 MHz bandwidth, carry 1, −1, −1, and 1, respectively, and subcarriers with indexes −28, −27, 27, and 28, in the RL-SIG in the 20 MHz bandwidth, carry 1, −1, −1, and 1, respectively; and
sending the generated L-SIG and RL-SIG.

11. The method according to claim 10, wherein when a transmission bandwidth is greater than the 20 MHz bandwidth, generating the L-SIG and the RL-SIG further comprises:
duplicating the L-SIG and the RL-SIG for each 20 MHz subchannel in the transmission bandwidth; and
applying a phase rotation for each 20 MHz subchannel.

12. The method according to claim 10, further comprising:
generating a legacy short training field (L-STF) and a legacy long training field (L-LTF) in accordance with an IEEE 802.11ac standard, wherein the L-STF and the L-LTF are carried on 48 subcarriers with indexes −26, . . . , −22, −20, . . . , −8, −6, . . . , −1, 1, . . . , 6, 8, . . . , 20, 22, . . . , and 26 in the 20 MHz bandwidth.

13. An information transmission method in a wireless local area network, comprising:
receiving a legacy signaling field (L-SIG) and a repeated legacy signaling field (RL-SIG); and
performing channel estimations, wherein a sequence 1, −1, −1, and 1 is used for channel estimations of subcarriers with indexes −28, −27, 27, and 28 in the L-SIG in a 20 MHz bandwidth, and the sequence 1, −1, −1, and 1, is used for channel estimations of subcarriers with indexes −28, −27, 27, and 28 in the RL-SIG in the 20 MHz bandwidth.

14. The method according to claim 13, wherein performing the channel estimations further comprises:
when a transmission bandwidth is greater than the 20 MHz bandwidth, using the sequence 1, −1, −1, and 1 for channel estimations of subcarriers with indexes −28, −27, 27, and 28 in each 20 MHz bandwidth in the transmission bandwidth.

15. The method according to claim 13, further comprising:
receiving a legacy short training field (L-STF) and a legacy long training field (L-LTF) in accordance with an IEEE 802.11ac standard, wherein the L-STF and the L-LTF are used for channel estimations of 48 subcarriers with indexes −26, . . . , −22, −20, . . . , −8, −6, . . . , −1, 1, . . . , 6, 8, . . . , 20, 22, . . . , and 26 in the L-SIG in the 20 MHz bandwidth, and the L-STF and the L-LTF are also used for channel estimations of 48 subcarriers with indexes −26, . . . , −22, −20, . . . , −8, −6, . . . , −1, 1, . . . , 6, 8, . . . , 20, 22, . . . , and 26 in the RL-SIG in the 20 MHz bandwidth.

16. An information transmission apparatus in a wireless local area network, comprising:
at least one processor; and
a non-transitory computer-readable storage medium coupled to the at least one processor and storing programming instructions for execution by the at least one processor, the programming instructions instruct the at least one processor to:

receive a legacy signaling field (L-SIG) and a repeated legacy signaling field (RL-SIG);

use a sequence −1, −1, −1, and 1 for channel estimations of subcarriers with indexes −28, −27, 27, and 28 in the L-SIG in a 20 MHz bandwidth; and use the sequence −1, −1, −1, and 1 for channel estimations of subcarriers with indexes −28, −27, 27, and 28 in the RL-SIG in the 20 MHz bandwidth.

17. The apparatus according to claim 16, wherein the programming instructions further instruct the at least one processor to:

when a transmission bandwidth is greater than the 20 MHz bandwidth, the sequence −1, −1, −1, and 1 is used for channel estimations of subcarriers with indexes −28, −27, 27, and 28 in each 20 MHz bandwidth in the transmission bandwidth.

18. The apparatus according to claim 16, the programming instructions further instruct the at least one processor to:

receive a legacy short training field (L-STF) and a legacy long training field (L-LTF) in accordance with an IEEE 802.11ac standard, wherein the L-STF and the L-LTF are used for channel estimations of 48 subcarriers with indexes −26, . . . , −22, −20, . . . , −8, −6, . . . , −1, 1, . . . , 6, 8, . . . , 20, 22, . . . , and 26 in the L-SIG in the 20 MHz bandwidth, and the L-STF and the L-LTF are also used for channel estimations of 48 subcarriers with indexes −26, . . . , −22, −20, . . . , −8, −6, . . . , −1, 1, . . . , 6, 8, . . . , 20, 22, . . . , and 26 in the RL-SIG in the 20 MHz bandwidth.

* * * * *